(12) United States Patent
Yang

(10) Patent No.: US 6,721,186 B2
(45) Date of Patent: Apr. 13, 2004

(54) ELECTRONIC SIGNAL ADAPTER MODULE OF FLASH MEMORY CARD

(75) Inventor: Wen-Ji Yang, Taipei (TW)

(73) Assignee: Carry Computer Eng. Co., Ltd., Hsin-Tien (TW)

( * ) Notice: Subject to any disclaimer, the term of this patent is extended or adjusted under 35 U.S.C. 154(b) by 0 days.

(21) Appl. No.: 10/058,916

(22) Filed: Jan. 30, 2002

(65) Prior Publication Data

US 2003/0081388 A1 May 1, 2003

(30) Foreign Application Priority Data

Oct. 30, 2001 (TW) .................................... 90218578 U

(51) Int. Cl.[7] .............................................. H05K 1/14
(52) U.S. Cl. ..................... 361/737; 361/671; 361/756; 361/825; 439/325; 439/327
(58) Field of Search ............................ 361/737, 671, 361/685, 723, 756, 825, 774; 439/325, 327, 377, 260, 267

(56) References Cited

U.S. PATENT DOCUMENTS

| | | | | |
|---|---|---|---|---|
| 4,874,323 A | * | 10/1989 | Shibano | 439/260 |
| 5,984,184 A | * | 11/1999 | Kojima | 235/441 |
| 6,447,313 B1 | * | 9/2002 | Zuin | 439/159 |

* cited by examiner

*Primary Examiner*—David Martin
*Assistant Examiner*—Hung Bui

(57) ABSTRACT

An electronic signal adapter module of a flash memory card is disclosed. A seat serves for storing one or a plurality of flash memory cards of different specifications. These flash memory cards use the same storage space in the seat and are inserted into the space at different timings. At least one substrate is combined with the seat. After the flash memory card is inserted into the seat, the substrate transfers signals between the flash memory cards and a reading and writing device. The feature of the present invention is that one end of the seat for being inserted by a flash memory card has two wings. Each wing is arranged with an elastic reed. By the reeds of the two wings, the flash memory card inserted into the seat generates an elastic force so that the pins on the flash memory card have preferred contact effect with the conductive elements of the substrates.

4 Claims, 6 Drawing Sheets

ELECTRONIC SIGNAL ADAPTER MODULE OF FLASH MEMORY CARD

FIELD OF THE INVENTION

The present invention relates to electronic signal adapters, and particularly to electronic signal adapter module of a flash memory card.

BACKGROUND OF THE INVENTION

With the advance of computer technology, the storage mediums developed from silicon semiconductor technologies become more and more popular. Flash memory cards are especially important in the silicon storage medium. Comparing with the floppy disks and compact disks, the flash memory cards are convenient, rapid, repeatable, shock-and-wet proofed, and consumes less power.

Various flash memory cards are developed by for example Sony, TOSHIBA, Siemens, Matsushita, Samaung, SanDisk, etc. Moreover, the flash memory cards are widely used to various digital products, such as PAMCIA cards, Compact Flash cards, SM cards (Smart Media cards), MMC cards (MultiMedia Cards), MS cards (Memory Stick Cards), SD cards (Secure Digital Cards), etc.

Flash memory cards are used in various portable digital devices, for example, digital cameras, digital recorders, PDAs, etc. for storing drawings, cartoons, music, and other software data. To enhance the data transformation connected the flash memory cards and mainframes (such as a personal computer, an industrial computer, a video decoder, etc. ), various reader for reading data in the flash memory card are developed.

One prior art data reader only serves for one flash memory card, while the various specifications of flash memory cards are developed. Therefore, one reader can not match to different kinds of flash memory cards. The manufactures develop novel devices for supporting different kinds of flash memory cards so that the user may use flash memory cards conveniently.

However, these prior arts have a defect of poor contact between the pins of the flash memory card and the conductive elements of an electronic signal adapter module. FIG. 1 shows a reader for supporting various flash memory cards. Since the inlet A of the slots must have a maximum compatible size for receiving flash memory cards having a larger size, such as SD cards and MMC cards. Although this prior art design may receive other kinds of flash memory cards, the positioning and stability of the flash memory cards are poor. Therefore, the prior art design of FIG. 1 only receives flash memory cards, but can not afford a preferred positioning and stability to the flash memory cards. As a consequence, the flash memory cards are possibly loose, slide or even fall out.

SUMMARY OF THE INVENTION

To achieve above objects, the present invention provides an electronic signal adapter module of a flash memory card. A seat serves for storing one or a plurality of flash memory cards of different specifications. These flash memory cards uses a same storage space in the seat and are inserted into the space at different timings. At least one substrate is combined with the seat. After the flash memory card is inserted into the seat; the substrate transfers signals between the flash memory cards and a reading and writing device. An inserted flash memory card is connected to a reader, thereby, the signals of the flash memory card being sent to the reader through the electronic signal adapter module. The feature of the present invention is that one end of the seat for being inserted by a flash memory card has two wings. Each wing is arranged with an elastic reed. By the reeds of the two wings, the flash memory card inserted into the seat generates an elastic force so that the pins on the flash memory card have preferred contact effect with the conductive elements of the substrates. Thereby, positioning and signal transformation between the flash memory card and the electronic signal adapter module are improved greatly.

The various objects and advantages of the present invention will be more readily understood from the following detailed description when read in conjunction with the appended drawing.

DETAILED DESCRIPTION OF THE PREFERRED EMBODIMENTS

Figure 1:
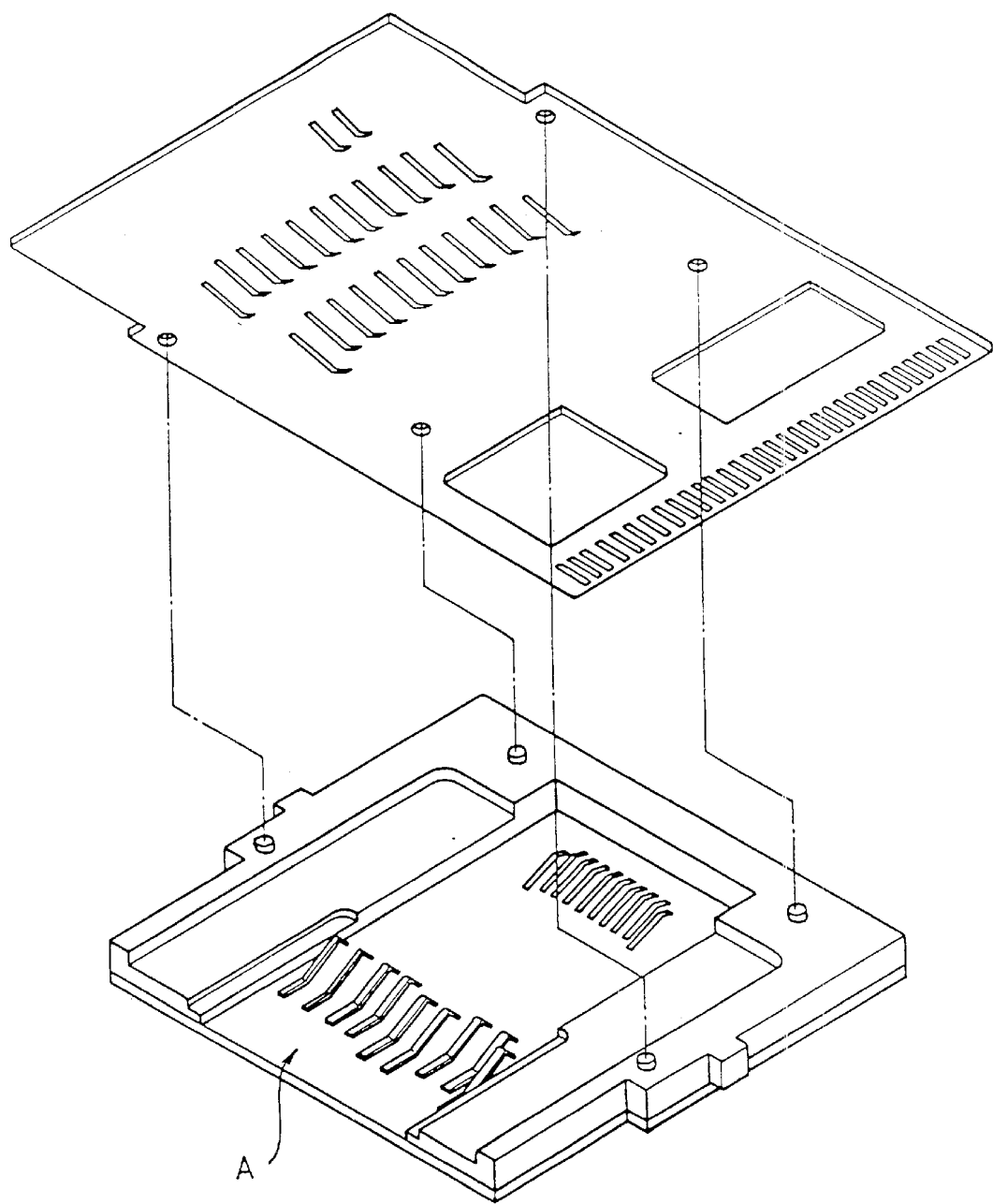
FIG. 1 is a prior art electronic signal adapter module of a flash memory card.
Figure 2:
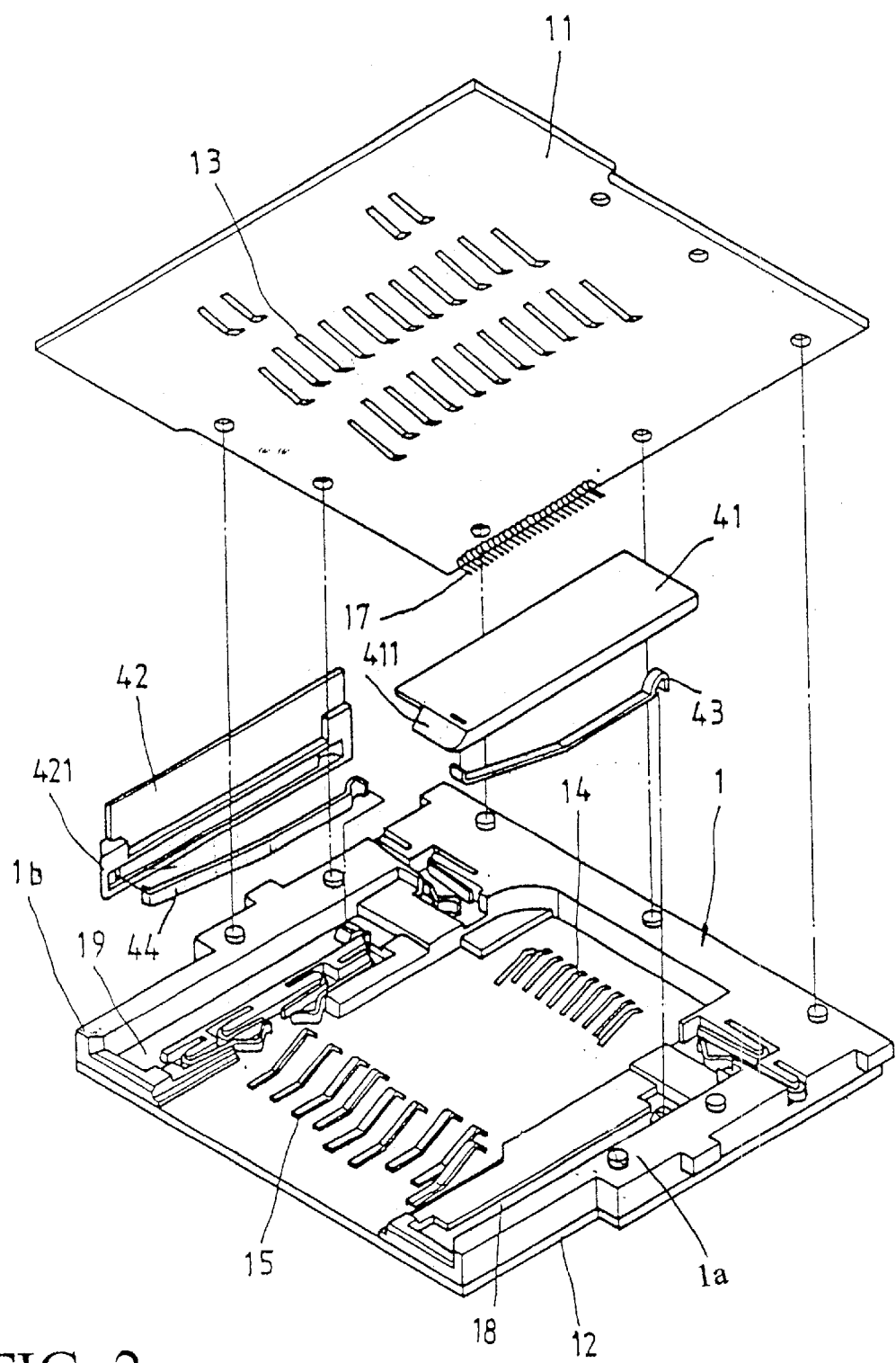
FIG. 2 is an exploded perspective view of the present invention.
Figure 3:
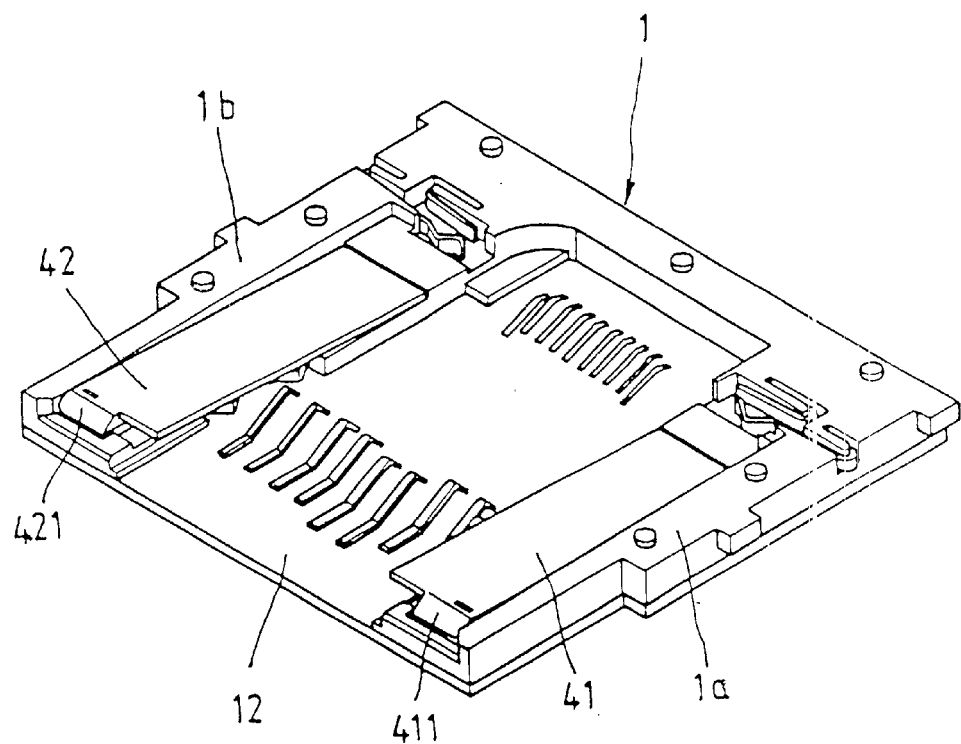
FIG. 3 shows a perspective view of the present invention.

Referring to FIGS. 2 and 3, the electronic signal adapter module of a flash memory card of the present invention is illustrated.

The electronic signal adapter module of a flash memory card of the present invention includes the following components.

A seat 1 serves for storing one or a plurality of flash memory cards of different specifications. These flash memory cards can use the same storage space and can be inserted into the space at different timing.

At least one substrate is combined with the seat 1. After the flash memory card is inserted into the seat 1, the substrate can transfer the signals between the flash memory cards and a reading and writing device. In this the present invention, the seat 1 allows a plurality of flash memory cards to be inserted at different timing. The substrates 11, 12 are arranged at a top or a bottom of the seat 1. Furthermore, the surfaces of the two substrates 11, 12 facing toward the seat 1 are installed with conductive elements 13, 14, and 15 which are arranged to be corresponding to the pins of flash memory cards inserted into the seat 1.

Figure 4:
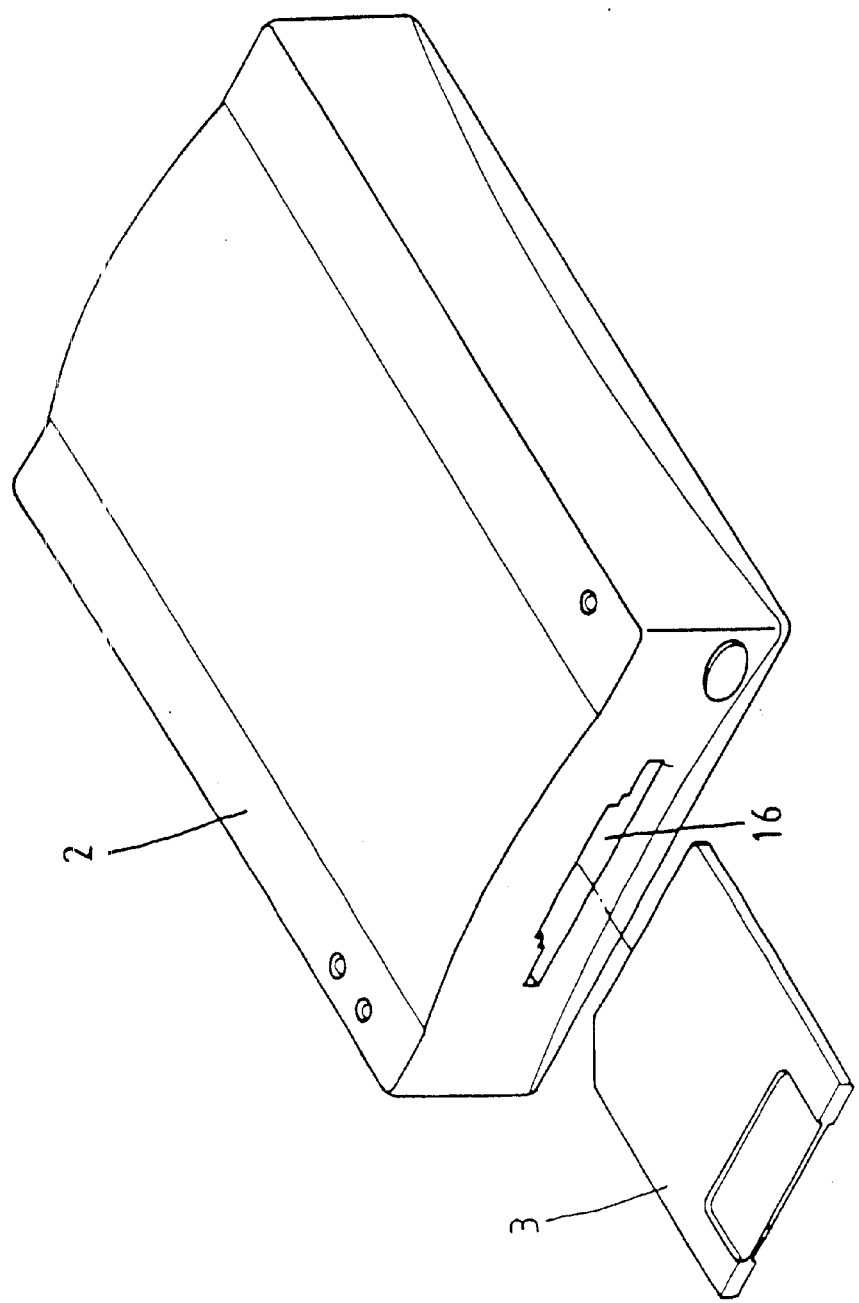
FIG. 4 is a schematic view showing the application of the data reader of a flash memory card.

After the electronic signal adapter module of a flash memory card of the present invention is formed; a plurality of slots 16 are formed. These slots can be used by a plurality of different flash memory cards which are inserted into the slots at different timing. Then the flash memory card is connected to a flash memory card data reader 2, as illustrated in FIG. 4, through the connecting components of the substrates. Thereby, the signals of the flash memory card 3 can be sent to the reader 2 through the electronic signal adapter module.

Figure 5:
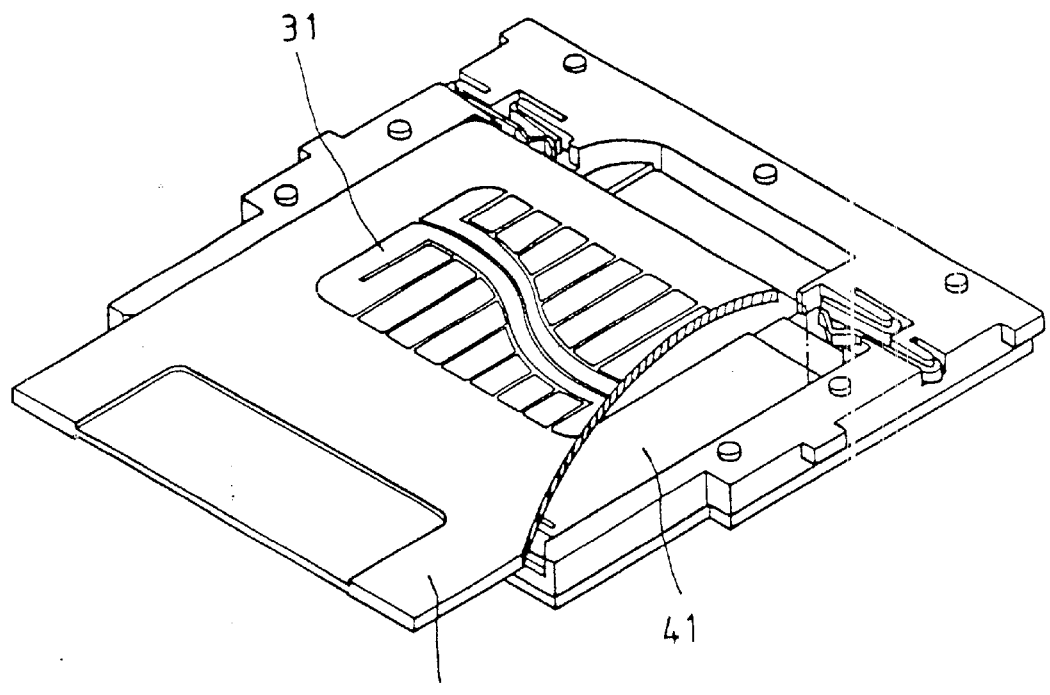
FIG. 5 shows that a SM card is inserted into the signal adapter module of the present invention.

The feature of the present invention will be described in the following. The two wings 1a, 1b at the flash memory card inserting end of the seat 1 are arranged with elastic reeds 41, 42. Referring to FIG. 5, by the reeds 41, 42, the flash memory card 3 inserted into the seat 1 generates an elastic force (referring to FIGS. 6 and 7) so that the pins 31 on the flash memory card 3 have preferred contact effect with the conductive elements of the substrates 11. Thereby, the positioning and signal transformation between the flash memory card and the electronic signal adapter module are improved greatly.

In above reeds 41, 42 of the present embodiment, one end of each of the reeds 41, 42 is connected to an elastic piece 43, 44. Another ends of the elastic piece 43, 44 face another ends of the reeds 41, 42, respectively, so as to be connected to the two wings 1a, 1b. Thereby, in normal condition, the reeds 41, 42 curl upwards.

The two wings 1a, 1b at positions positioning the elastic pieces 43, 44 are installed with grooves 18, 19 for receiving the elastic pieces 43, 44 and for adjusting the heights of the reeds 41, 42. Moreover, each of the reeds 41, 42 have respective guide portions 411, 421 at positions adjacent to the inserting portions of the flash memory card and towards the seat 1 so that the flash memory card can slide to the reeds 41, 42 successfully.

Figure 6:
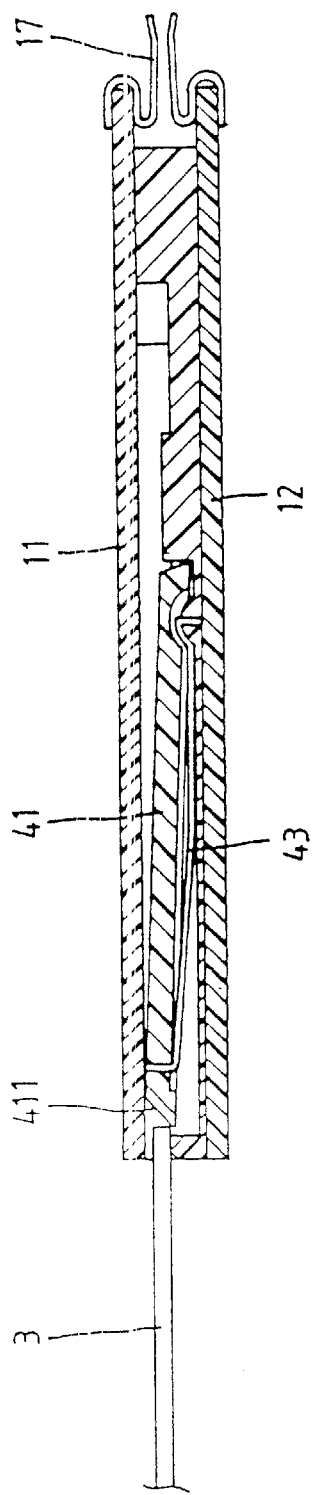
FIG. 6 is a lateral cross sectional view showing that a SM card is inserted into the signal adapter module of the present invention.
Figure 7:
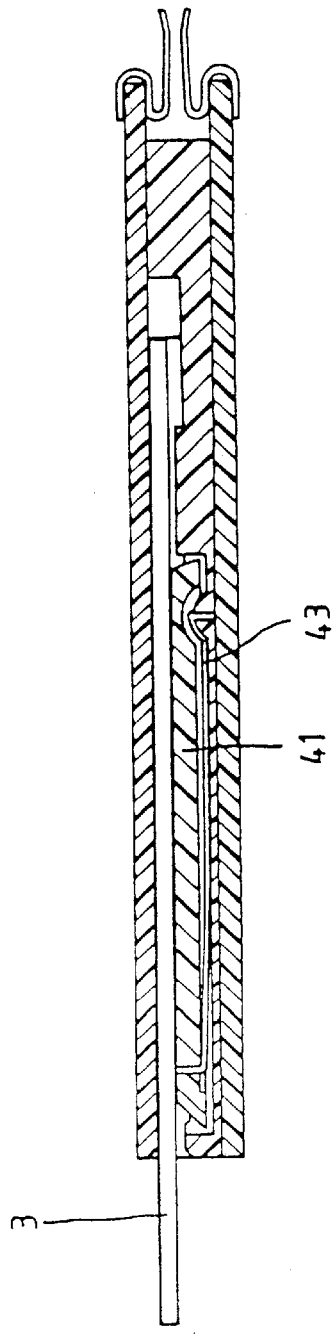
FIG. 7 is an assembled view of FIG. 6.
Figure 8:
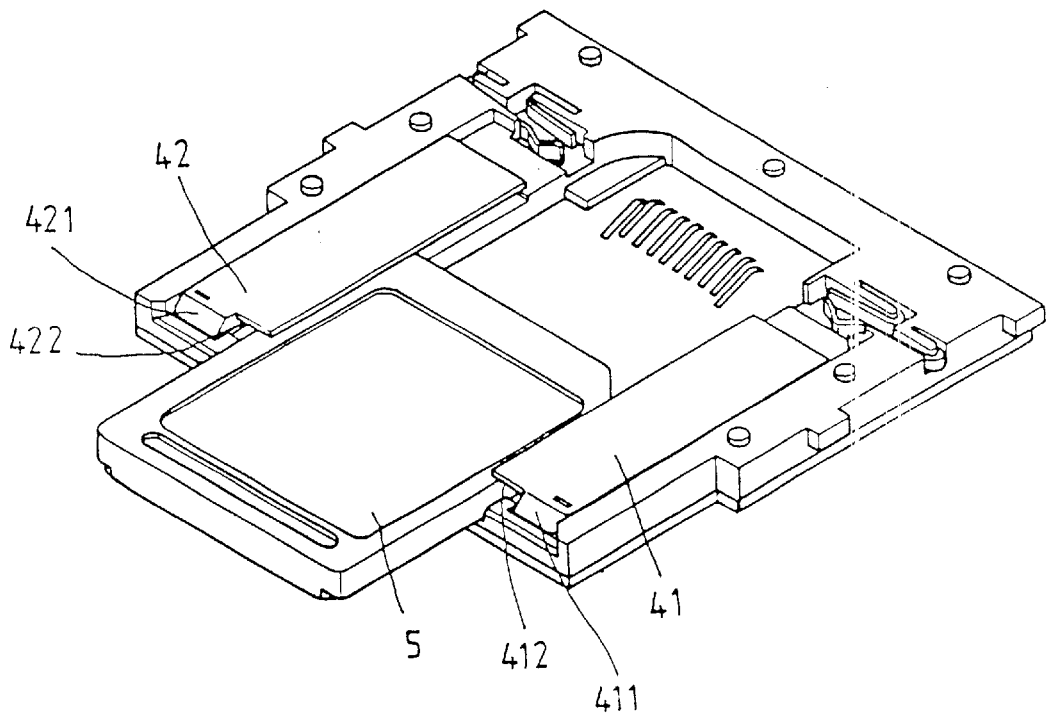
FIG. 8 shows that a SD card is inserted into the signal adapter module of the present invention.
Figure 9:
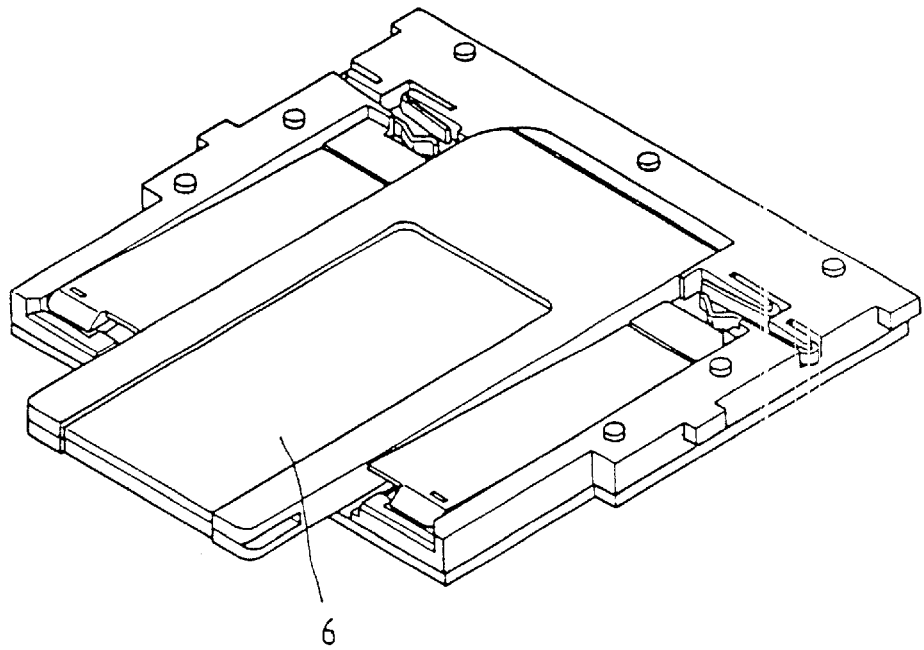
FIG. 9 shows that an MS card is inserted into the signal adapter module of the present invention.

With reference to FIGS. 8 and 9, the adapter module serves to receive different flash memory card. FIG. 8 shows an SD card 5 and FIG. 9 shows an MS card 6. Referring to FIG. 6, since after the SD card is inserted, in general, the width thereof is smaller than a maximum allowance of the module. Therefore, the prior art adapter module used with a flash memory card is possible that the flash memory card is loose or has no preferred contact ability, while in the present invention, two wings 1a, 1b at the seat 1 are used to compensate the prior art defect about the flash memory card. Namely, the sides of the guide portions 411, 421 of the reeds 41, 42 near the flash memory card are installed with notches 412, 422 so that the flash memory card can be inserted successfully. By the elasticity of the reeds 41, 42, the flash memory card (SD card) is confined between the reeds 41, 42 and the substrates 12. Thereby, the flash memory card is positioned by a preferred way.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An electronic signal adapter module used for a flash memory card; each flash memory card having a plurality of pins for conducting signals, comprising:

a seat serving for receiving at least one flash memory card;

two substrates arranged at a top and a bottom of the seat, respectively, for transferring signals between a flash memory card inserted into the seat and a reader connected to the two substrates; surfaces of the two substrates facing toward the seat being installed with conductive elements which are arranged so that when the flash memory cards are inserted into the seat; the conductive elements are power-conductive to the respective pins of the flash memory card; characterized in that:

one end of the seat for receiving the flash memory card has two wings; each wing is arranged with an elastic reed; and one end of each of the reeds is connected to one end of an elastic piece; another end of the elastic piece faces another end of the respective reed so as to be connected to the respective wing.

2. The electronic signal adapter module as claimed in claim 1, wherein the two wings at positions positioning the elastic pieces are formed with grooves for receiving the elastic pieces and for adjusting heights of the reeds.

3. The electronic signal adapter module as claimed in claim 1, wherein each of the reeds have respective guide portions at positions adjacent to inserting portions of the flash memory card and towards the seat so that the flash memory card slides to the reeds successfully.

4. The electronic signal adapter module as claimed in claim 1, wherein at a side of the reed having the guide portion has a notch at a position near the flash memory card.

* * * * *